United States Patent
Dickson et al.

(10) Patent No.: US 6,445,983 B1
(45) Date of Patent: Sep. 3, 2002

(54) SENSOR-FUSION NAVIGATOR FOR AUTOMATED GUIDANCE OF OFF-ROAD VEHICLES

(75) Inventors: Monte A. Dickson, Naperville, IL (US); Noboru Noguchi, Nishi-ku (JP); Qin Zhang, Champaign, IL (US); John F. Reid, Champaign, IL (US); Jeffrey D. Will, Champaign, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/611,510

(22) Filed: Jul. 7, 2000

(51) Int. Cl.⁷ .................................................. G05D 1/00
(52) U.S. Cl. ............................ 701/23; 701/36; 701/200
(58) Field of Search ............................ 701/23, 36, 50, 701/200, 213

(56) References Cited

U.S. PATENT DOCUMENTS

| | | |
|---|---|---|
| 3,834,036 A | 9/1974 | Scarritt, Sr. |
| 4,165,796 A | 8/1979 | Petz |
| 4,211,921 A | 7/1980 | Kanetou et al. |
| 4,298,084 A | 11/1981 | Newell |
| 4,366,756 A | 1/1983 | Brum |
| 4,505,094 A | 3/1985 | Demorest |
| 4,515,221 A | 5/1985 | van der Lely |

(List continued on next page.)

FOREIGN PATENT DOCUMENTS

| | | |
|---|---|---|
| AU | B-39747/95 | 11/1995 |
| AU | WO 96/17279 | 6/1996 |

OTHER PUBLICATIONS

Image Processing for Path–Finding in Agricultural Field Operations, ASAE Paper No. 85–3037, Jun. 23–26, 1985.
Path–finding by Image Processing in Agricultural Field Operations, ASAE/SAE 861455, Nov. 3–5, 1986.

(List continued on next page.)

*Primary Examiner*—William A. Cuchlinski, Jr.
*Assistant Examiner*—Olga Hernandez (57) ABSTRACT

An automatically guided agricultural vehicle with multiple sensors is disclosed. The automatically guided agricultural vehicle includes guidance parameter identification using multi-sensor data fusion for real-time vehicle guidance. To insure robust navigation, a map-based guidance and sensor-based guidance are disclosed and integrated because no individual sensing technology is ideally suited for vehicle automation under all modes of use. The appropriate sensor and operational mode will depend on the field status of time or operation. A fiber optic gyroscope (FOG) and a real-time kinematic GPS (RTK-GPS) and machine vision are added to the guidance system in order to improve reliability of the system for vehicle guidance. The navigator includes key functions of selecting control mode, correcting position by vehicle roll/pitch inclinations, Kalman filtering, and calculating a steering angle.

9 Claims, 7 Drawing Sheets

U.S. PATENT DOCUMENTS

| | | | |
|---|---|---|---|
| 4,528,804 A | 7/1985 | Williams | |
| 4,640,365 A | 2/1987 | Schmidt | |
| 4,729,449 A | 3/1988 | Holmquist | |
| 4,821,807 A | 4/1989 | Trumm | |
| 4,868,752 A | 9/1989 | Fujii et al. | |
| 4,918,441 A | 4/1990 | Bohman | |
| 5,040,116 A | 8/1991 | Evans, Jr. et al. | |
| 5,060,290 A | 10/1991 | Kelly et al. | |
| 5,103,924 A | 4/1992 | Walker | |
| RE34,080 E | 9/1992 | Schmidt | |
| 5,163,002 A | 11/1992 | Kurami | |
| 5,207,739 A | 5/1993 | Orthman | |
| 5,279,068 A | 1/1994 | Rees et al. | |
| 5,357,432 A | 10/1994 | Margolis et al. | |
| 5,367,457 A | 11/1994 | Ishida | |
| 5,410,479 A | 4/1995 | Coker | |
| 5,430,810 A | 7/1995 | Saeki | |
| 5,442,552 A | 8/1995 | Slaughter et al. | |
| 5,548,516 A * | 8/1996 | Gudat et al. | 701/200 |
| 5,610,815 A * | 3/1997 | Gudat et al. | |
| 5,612,883 A * | 3/1997 | Shaffer et al. | 701/300 |
| 5,615,116 A * | 3/1997 | Gudat et al. | 701/23 |
| 5,621,460 A | 4/1997 | Hatlestad et al. | |
| 5,640,323 A * | 6/1997 | Kleimenhagen et al. | 701/1 |
| 5,646,843 A * | 7/1997 | Gudar et al. | 701/3 |
| 5,646,845 A * | 7/1997 | Gudat et al. | 701/41 |
| 5,648,901 A * | 7/1997 | Gudat et al. | 701/23 |
| 5,657,226 A * | 8/1997 | Shin et al. | 701/23 |
| 5,661,817 A | 8/1997 | Hatlestad et al. | |
| 5,680,306 A * | 10/1997 | Shin et al. | 180/167 |
| 5,680,313 A * | 10/1997 | Whittaker et al. | 701/300 |
| 5,684,696 A * | 11/1997 | Rao et al. | 701/25 |
| 5,751,576 A * | 5/1998 | Monson | 364/188 |
| 5,838,562 A * | 11/1998 | Gudat et al. | 701/213 |
| 5,928,309 A * | 7/1999 | Korver et al. | 701/214 |
| 5,956,250 A * | 9/1999 | Gudat et al. | 318/587 |
| 5,995,894 A * | 11/1999 | Wendte | 701/50 |

OTHER PUBLICATIONS

Vision–Guided Off–Road Vehicle, ASAE Paper No. 89–1516, Dec. 12–15, 1989.

Determining a Guidance Directrix in Row Crop Images, ASAE Paper No. 85–3549, Dec. 17–20, 1985.

Detecting Crop Rows Using the Hough Transform, ASAE Paper No. 86–3042, Jun. 29–Jul. 2, 1986.

Vision–Based Guidance of an Agricultural Tractor, IEEE, vol. 7, No. 2, Apr. 1987.

Automatic Tractor Guidance with Computer Vision, SAE Paper No. 871639, Sep. 14–17, 1987.

An Algorithm for Separating Guidance Information from Row Crop Images, ASAE Nov.–Dec. 1988, vol. 31, No. 6.

Distributed Control for Vision Based Tractor Guidance–ASAE Paper No. 89–7517, Dec. 12–15, 1989.

Performance of a Vision–Based Tractor Guidance System, SAE Paper No. 901589, Sep. 10–13, 1990.

An Algorithm for Computer Vision Sensing of a Row Crop Guidance Directrix, SAE Paper No. 911752, Sep. 9–12, 1991.

Machine Vision System for Field Sprayer Guidance, pp. 192–200.

Image analysis for vision–based agricultural vehicle guidance, Optics in Agriculture, vol. 1379, Nov. 7–8, 1990.

Agricultural Vehicle Guidance Sensor, ASAE Paper No. 931008, Jun. 20–23, 1993.

Impact of Navigation of Farming, ASAE Paper No. 88–1602, Dec. 13–16 1988.

Vision Systems to Track Row Crops For Applying Agricultural Herbicides, Wescanex '91, May 29–30, 1991, IEEE (91CH2927–Z).

The Adoption of Automatic Field Operations, Wescanex '91, May 29–30, 1991, IEEE 91CH2927–Z.

Precise Navigation, Guidance and Control Services within the Agricultural Community, The Journal of Navigation, vol. 42, No. I, pp. 1–10.

A vision–guided agricultural tractor, International Federation of Robotics, pp. 467–473, Jul. 14–16, 1993.

Vision Guidance of Agricultural Vehicles, Autonomous Robots, vol. 2–1995.

Automatic Control Agricultural Machines, pp.267–275, IEEE 88CH2533–8.

Agricultural Robots, Automatic Control, Jul. 27–31, 1987.

Automatic Lawn Mower Guidance Using a Vision System, The American Society of Mechanical Engineers, vol. II, Jul. 18–20, 1988.

Buffalo 200, Scout II Guidance System, Paper No. Li–SII 99450M, Fleischer Manufacturing, Inc. Columbus, NB.

Sukup ®Guidance System Slide Guide, Paper No. L1164–9205, ©1992, Sukup Manufacturing Company, Sheffield, IA.

Row Crop Navigator®, John Day Company, ©1994 Automatic Equipment Mfg. Co., Pender, NB.

Sukup® Pivoting Guidance System Auto Guide, Paper No. L1135–9301M, © 1993, Sukup Manufacturing Company, Sheffield, IA.

* cited by examiner

SENSOR-FUSION NAVIGATOR FOR AUTOMATED GUIDANCE OF OFF-ROAD VEHICLES

FIELD OF THE INVENTION

The invention relates to a navigation system integrating multiple sensors to provide an automated guidance system for an off-road vehicle, such as an agricultural vehicle. The sensors include a real-time kinematic global positioning system receiver, a fiber optic gyroscope, and a machine vision system. In particular, the vehicle guidance system is adapted to provide both straight and curved path navigation for an off-road vehicle automatically at velocities up to three meters per second. Further, the autonomous vehicle is configured to utilize a plurality of operational modes dependent on the integrity of the sensor inputs.

BACKGROUND OF THE INVENTION

Automated agricultural vehicle guidance for maneuvering equipment, while avoiding overrunning row crops, is a skill and labor intensive task. The adoption of new agricultural technologies, such as precision agriculture, makes the maneuvering even more difficult. Meanwhile, the shortage and aging workforce in agriculture results in a decrease of skilled machine operators. Therefore, the development of automatic autonomous agricultural equipment is of commercial significance and societal importance.

Accordingly, there is a need for automatically guided agricultural vehicles. In particular, there is a need for automatically guided off-road or agricultural vehicles utilizing multiple sensor systems. Also, there is a need for automated off-road vehicle guidance systems that include guidance parameter identification using multi-sensor data fusion for real-time vehicle guidance. Further, there is a need for robust navigation systems in which map-based guidance and sensor-based guidance are integrated.

SUMMARY OF THE INVENTION

An exemplary embodiment of the invention relates to an automatic guidance system for an agricultural vehicle. The guidance system includes at least two sensors configured to gather information representative of at least one of vehicle relative position and attitude. The guidance system also includes an information processor having a memory and a central processing unit, and the information processor coupled to at least two sensors. Further, the guidance system includes a program in the memory of the information processor configured to be executed by the central processing unit, the program configured to select a mode of operation, from at least two modes of operation, based on the information from at least one sensor, each mode of operation running a different control program.

Another exemplary embodiment of the invention relates to a method of controlling an off-road vehicle. The method includes sensing at least one of vehicle relative position and vehicle attitude by at least two sensors, each sensor providing an electrical signal representative of at least one of vehicle relative position and vehicle attitude. The method also includes communicating electrical signals from the sensors to a processing device. The method further includes selecting a mode of operation based on the electrical signals from the sensors and running a control program based on the mode of operation selected.

Still another exemplary embodiment of the invention relates to an agricultural vehicle configured to be guided through a field by an automatic guidance system. The agricultural vehicle includes a vision system configured to gather visual input information about field characteristics in the form of a digitized image. The agricultural vehicle also includes a positioning system configured to gather position information about the relative position of the agricultural vehicle and a processing system configured to select a mode of operation based on the information gathered from the vision system and the positioning system. Further, the agricultural vehicle includes a control system configured to control the agricultural vehicle based on the mode of operation.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
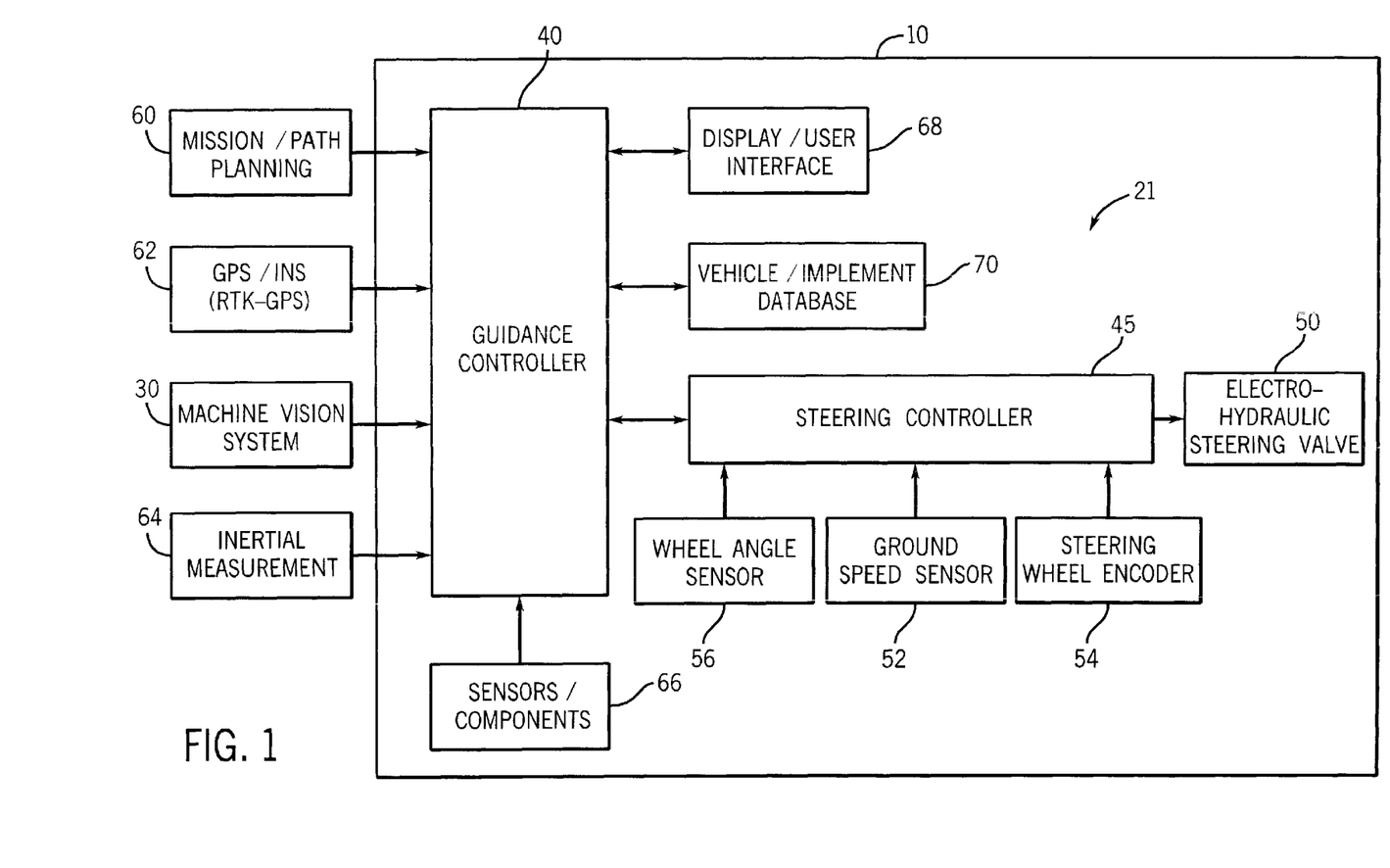
FIG. 1 is a block diagram of a universal guidance system.

Conventionally, in agricultural automation, no individual sensing technology is ideally suited for vehicle automation under all modes of use. The appropriate sensor will depend on the field status at the time of operation. But, even under a given field operation, the availability of data from multiple sensors provides opportunities to better integrate sensor data and provide guidance control results superior to the use of an individual sensor. Referring to FIG. 1, a navigation system 21 is adapted to choose the most appropriate sensor combinations to determine a steering angle for a vehicle 10, such as, but not limited to, off-road agricultural vehicles like tractors and combines, used to follow a predetermined path. In an exemplary embodiment, navigation system 21 is a sensor-fusion integration of a real-time kinematic global positioning system (RTK-GPS) 62 which is able to measure a position with an error of approximately two centimeters, a fiber optic gyroscope 64 or other inertial measurement device, and a machine vision system 30. RTK-GPS 62 may include, but is not limited to, a GPS receiver, a differential GPS (DGPS) receiver, a carrier-phase differential GPS (CDGPS), or other applicable positioning devices. Machine vision system 30 may include a charge coupled device camera, an analog video camera with an associated frame grabber and digitizer, or other applicable imaging devices. Fiber optic gyroscope 64 may be, but is not limited to, a conventional gyroscope, any applicable inertial measurement devices, or attitude sensing devices. Navigation system 21 may also include a mission/path planning system 60, for recording and/or planning vehicle paths and missions. Utilizing three navigation sensor systems 30, 62, and 64 provides a redundant sensing system.

Agricultural tractor or vehicle 10 may need to perform multiple tasks over the crop growing season, such as tillage, planting, cultivation, fertilizing and chemical applications, and harvesting. Because off-road vehicles are, in general, used under various outdoor environments and for long periods of time, the optimal combination of navigation sensors 30, 62, and 64 must change and adapt to the usage. For example, if there are crop rows in existence after planting a farm field, machine vision system 30 can provide the relative offset and heading error from identification and/or visualization of crop rows, therefore vision system 30 may be an optimal navigation sensor in this situation. Alternatively, in the situation that there are no landmarks like crop rows, machine vision system 30 may no longer be viable as a control sensor. In this situation, global positioning system (GPS) 62 and fiber optic gyroscope (FOG) 64 may be used as navigation sensors. Additionally, the outdoor environment where the automated guidance system 21 is used may include nature-oriented disturbances and error sources provided to the navigation sensors (for example, sun attitude and luminance that cause disturbances in machine vision; obstacles such as trees and buildings cause disturbances for GPS). Therefore, a redundant sensing system is desirable to improve system performance, robustness, and stability.

In an exemplary embodiment of navigation system 21, a navigation map may be produced by recording travel paths and operations for the tractor and the implement. Such a navigation map may be recorded by mission/path planning system 60, stored in a vehicle/implement database 70 and selectively displayed on a display/user interface 68. In particular, navigation system 21 is configured to selectively repeat completely identical operations and travels that were accomplished with previous human driving. The navigation map may also be produced away from the field, such as in an office, using global information system (GIS) software to preplan the travel paths and operations. The choice of where and when the navigation map is generated, is wholly dependent on the users situation.

Referring again to FIG. 1, a steering controller 45 is in communication with a guidance controller 40. Guidance controller 40 receives sensor inputs from systems and sensors 30, 60, 62, and 64. Steering controller 45 receives input signals from a wheel angle sensor 56 and a ground speed sensor 52. Wheel angle sensor 52 may be mounted and aligned over the top of the king pin (the swivel joint that the steering turns on). In a preferred embodiment, the wheel angle sensor may be a 1 K Ohm rotary potentiometer aligned with the king pin on the right wheel. The wheel angle sensor may be calibrated for left and right wheels or may be calibrated for non-linearities. Alternatively, the sensor may be mounted on the king pin of the left wheel, a sensor may be mounted on both king pins, or other sensing devices may be utilized to sense wheel angle.

The steering actuator includes an electro-hydraulic valve 50 coupled to a steering cylinder. Steering valve 50 may be, in a preferred embodiment, an electro-hydraulic valve available from Eaton Corporation of Milwaukee, Wis. The valve is used to control the flow of fluid to a steering cylinder. The valve preferably has a capacity of seven gallons per minute and requires 0.62 to 0.65 amps to open the valve. The valve may be controlled with 100 hertz pulse width modulated (PWM) frequency with approximately 10% hysteresis. A steering wheel encoder 56 determines the control signal to be sent to electro-hydraulic steering valve 50 based on the steering command received from the vehicle operator through a control device such as a steering wheel, when the vehicle is being controlled in a manual mode. Steering wheel encoder 56 may also be used to detect steering wheel motion. When motion is present, guidance system 21 may be disengaged to manual mode.

Referring again to FIG. 1, a sensor fusion universal guidance system 21 for an agricultural vehicle is depicted. Guidance system 21 includes a guidance controller 40 and a steering controller 45. Guidance controller 40 receives information from a mission or path planning subsystem 60, a CDGPS/inertial navigation system (INS) 62 for providing positional and orientational measurements in the farm field, a vision sensor 30 and an inertial measurement system 64 used for providing orientation of the vehicle in the farm field. Guidance controller 40 also receives inputs from sensors or components 66 that are used to detect conditions which may be hazardous to the guidance system 21, hazardous to vehicle 10 or when the vehicle may be hazardous to the surrounding environment. Sensor fusion universal guidance system 21 utilizes guidance controller 40 to bring together measurement signals from a plurality of sensors.

Guidance controller 40 is also in communication with a display or user interface 68 providing output data to the driver and further providing an interface for receiving input from the user. Such a display 68 may be, but is not limited to, a CRT or LCD display inside the driver cabin of agricultural vehicle 10. In a preferred embodiment, the display and master controller may be an LCD display having a screen of 10.4 inches diagonal and a resolution of 640×480 pixels. The master controller may be run on a Pentium® 5 166 megahertz ruggedized computer powered by 12 volts DC and further may include an image capture board used to digitize images and input/output boards installed in the computer itself. Alternatively, other computer and display configurations may be used.

Guidance controller 40 also is in communication with a vehicle implement database 70 which provides information about the vehicle and implements attached thereto. Further, vehicle implement database 70 may store information relating to the particular vehicle and the vehicle use history or any other information that may be accessed at a later time.

Figure 2:
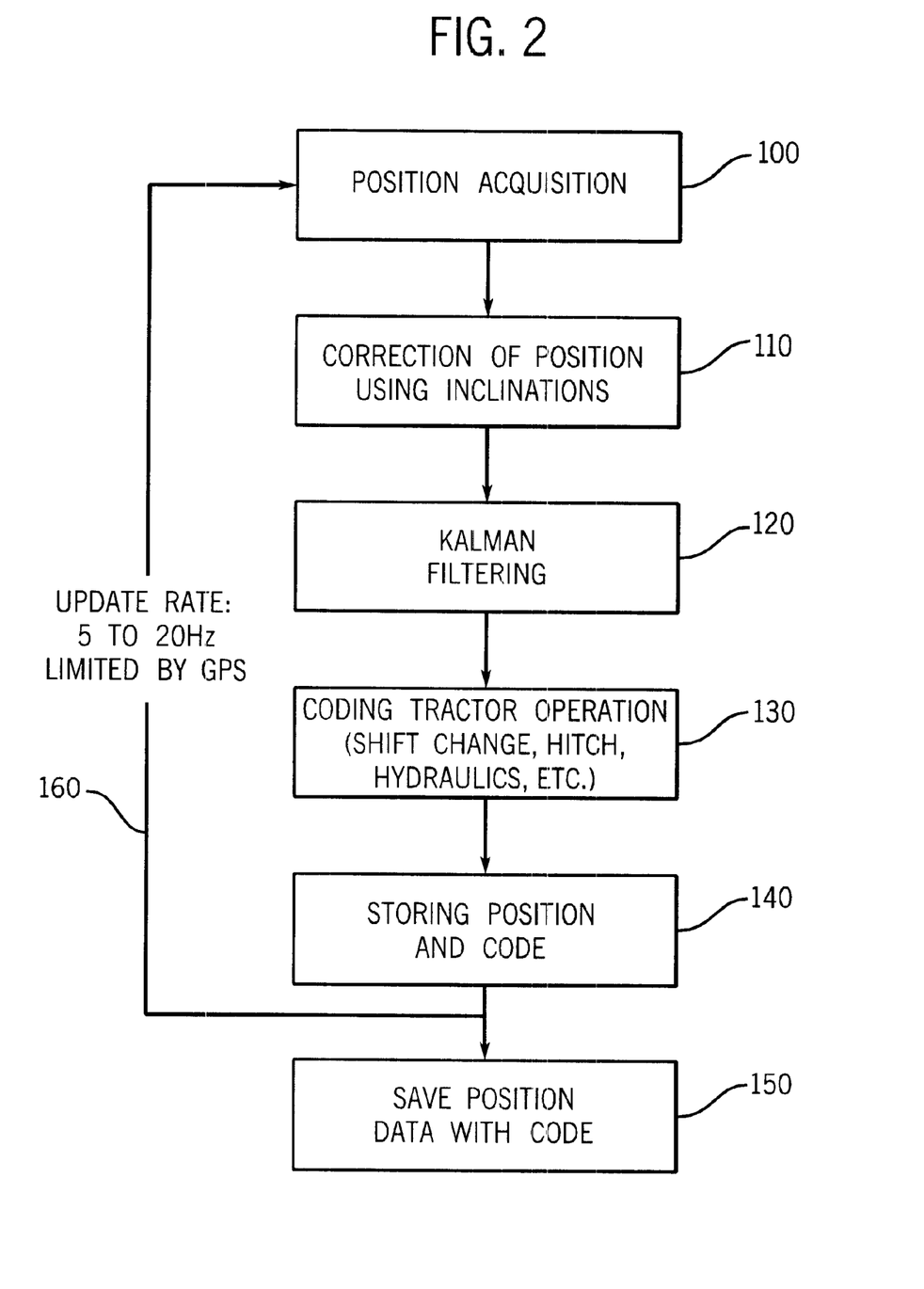
FIG. 2 is a flowchart of the navigation mapping system.

Referring now to the flowchart of FIG. 2, an RTK-GPS 62 (FIG. 1) can gather position data at the update rate of five (5) Hz (and alternatively 20 Hz or faster) in position acquisition step 100. The spatial resolution of the navigation map produced using a navigation mapper utilizing the process depicted in FIG. 2 may be limited by the update rate. A correction of position using inclinations step 110 and a Kalman filter 120 may be utilized to improve position accuracy. Additionally, the navigational map may be created under a global information system environment (GIS), such as a GPS system, utilizing the position data generated. The coordinate system for the navigational map may be based on a global three dimensional coordinate (latitude, longitude, height). The navigational map may code tractor operations in step 130, such as shift set, shift change, engine speed set, implement control, etc. as well as paths to travel. All the information may be stored in a storing position and code step 140. The information is saved in a step 150 and is updated in an update loop 160. The information may be saved in an implement/vehicle database 70 (FIG. 1).

The navigation point (NavPoint), which is a component of the navigational map may be defined as composed of latitude, longitude, and height in a sixty-four-bit data string. The data string may include the implement parameters, settings, and conditions such as depth and tractor travel conditions like transmission, engine speed set, etc. Further, the data string may have additional room for expansion or additional data so as to store variable rate information of implements. Additionally, the NavPoint can be automatically converted between latitude, longitude coordinates and other coordinate systems.

Navigator 21 (FIG. 1) is responsible (using steering controller 45) for generating guidance signals, including an offset and a heading error in determination of a desired steering angle, the steering angle error is used to command an electro-hydraulic steering valve 50.

Figure 3:
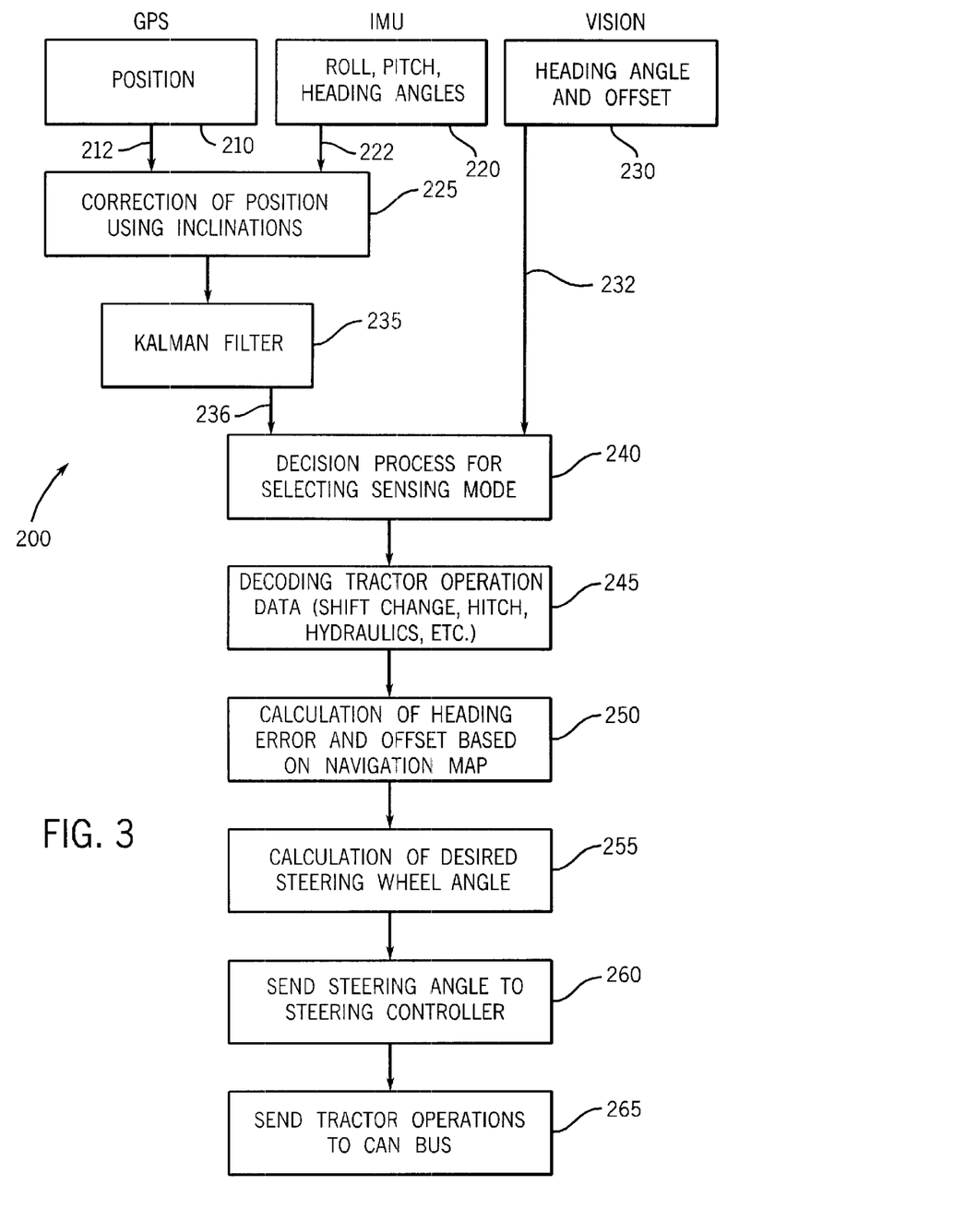
FIG. 3 is a flowchart of the navigation system.

A flowchart for an exemplary navigator 200 is depicted in FIG. 3. Navigator 200 includes key functions of selecting the operational or control mode, correcting position by vehicle roll/pitch inclinations, Kalman filtering, and calculating a steering angle and decoding a data string in the NavPoint. As depicted in FIG. 2, navigator 200 includes a GPS system 210, a fiber optic gyroscope 220 and a vision system 230. GPS system 210 provides a position signal 212. Fiber optic gyroscope 220 provides a heading angle signal 222, and vision system 230 provides a heading angle and offset 232. Position signal 212 and roll and pitch angle are provided to a correction of position step 225 which is further provided to a Kalman filter or estimator 235. The estimation signal 236 provided from Kalman filter 235 and the heading angle and offset 232 are provided to a decision process 240 for selecting the appropriate sensing mode. Decision process 240 selects the appropriate sensing mode and communicates that information to a decoding tractor operation data step 245 which decodes the tractor operations and communicates that information to a calculation of heading error and offset based on the navigational map step 250. The heading error and offset are communicated to a calculation of desired steering wheel angle 255 which provides the desired steering wheel angle to a send steering angle to separate controller step 260. Send steering angle to steering controller step 260 provides a control signal to the EXH steering valve. Tractor control operations are then sent to the controller area network CAN bus.

It is desirable to receive an accurate vehicle position for the guidance system. However, a GPS antenna is conventionally installed at the top of vehicle 10, for example about three meters above the ground, and a position error may be generated further from vehicle inclinations (roll and pitch directions). Therefore, a correction method of the position error caused by a vehicle inclinations plus antenna offset must be compensated for in the navigation system.

Utilizing an Eulerian angle coordinate system, a corrected position at the GPS antenna under a Cartesian coordinate system is $$\begin{pmatrix} X_a \\ X_a \\ Z_a \end{pmatrix} = \begin{pmatrix} X \\ Y \\ Z \end{pmatrix} - E^{-1}(\phi, \theta_p, \theta_r) \cdot \begin{pmatrix} a \\ b \\ h \end{pmatrix}, \text{ where} \tag{1}$$

$X_a$, $Y_a$, $Z_a$ is the corrected position at the GPS antenna; X, Y, Z is the antenna position acquired by the GPS; a, b, h is the distance from the center of gravity to the GPS antenna; $\theta_r$ is the roll angle measured by a posture sensor; $\theta_p$ is the pitch angle measured by a posture sensor; and $\theta$ is the heading angle based on the X-Y coordinate system. A matrix E may be used as a transformation matrix which transforms the vehicle coordinate system to the X, Y, Z coordinate system, where E is defined as $$E^{-1}(\phi, \theta_p, \theta_r) = E(-\phi, -\theta_p, -\theta_r) = \tag{2}$$

$$\begin{pmatrix} \cos\theta_r\cos\phi + \sin\theta_r\sin\theta_p\sin\phi & \cos\theta_p\sin\phi & -\cos\theta_r\sin\theta_p\sin\phi + \sin\theta_r\cos\phi \\ -\cos\theta_r\sin\phi + \sin\theta_r\sin\theta_p\cos\phi & \cos\theta_p\cos\phi & -\cos\theta_r\sin\theta_p\cos\phi - \sin\theta_r\sin\phi \\ -\sin\theta_r\cos\theta_p & \sin\theta_p & \cos\theta_r\cos\theta_p \end{pmatrix}$$

Figure 4:
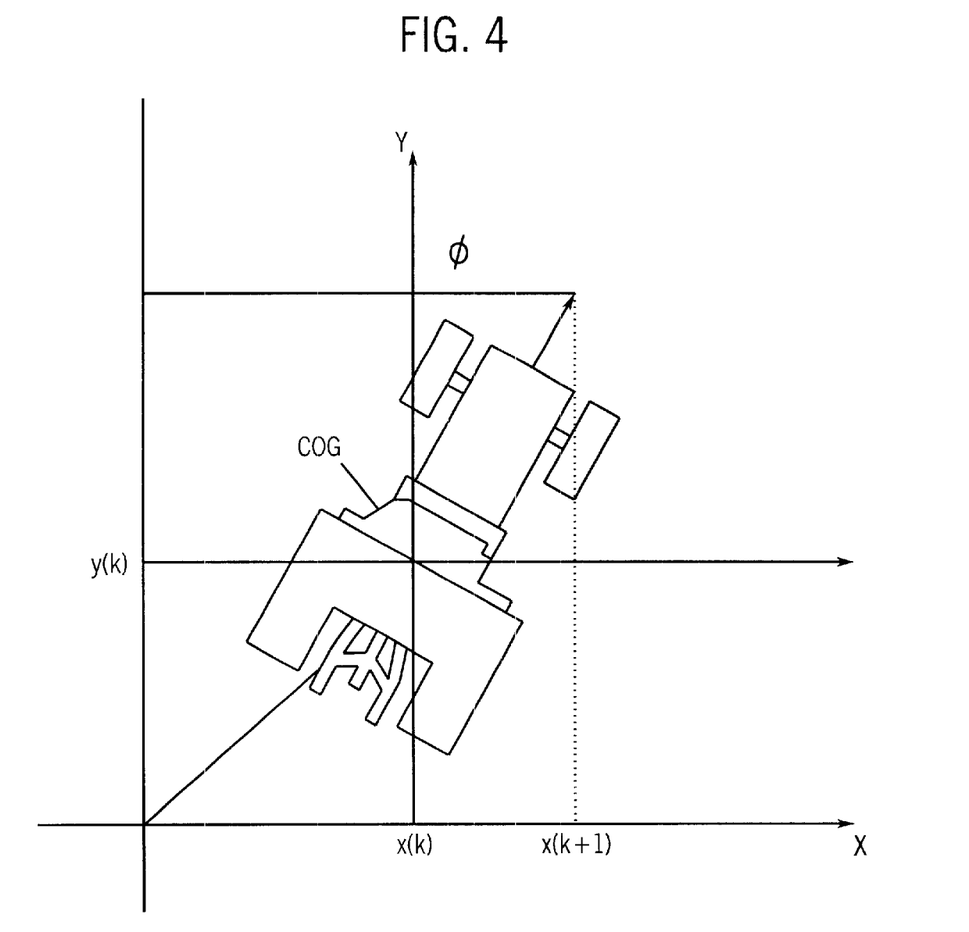
FIG. 4 is a diagram of the coordinate systems for a tractor.

As shown in FIG. 4, the definition of roll ($\theta_r$) and pitch ($\theta_p$) is shown with respect to tractor 10. In an exemplary embodiment, an inertial measurement unit (IMU) which consists of a combination of accelerometers, fiber optic gyros (FOG) (or other solid state gyroscopes). A FOG is available from Japan Aviation Electronics Industry as Part No. JCS-7401A and may be used to measure roll and pitch inclinations.

To integrate the RTK-GPS 202 and the FOG 222 signals, a Kalman filter 235 may be utilized in navigation system 200. Kalman filter 235 may be used to remove the FOG 222 drift error and to coordinate in real-time the outputs of the FOG 222 and the GPS 212 signals. Other estimation algorithms may also be used to provide removal of drift error and coordination of real-time output signals including, but not limited to, extended Kalman filters, neural networks, fuzzy logic, Wiener filtering, Levinson filtering, and the like.

Assuming that the vehicle movement may be approximated by a linear mode in defining the coordinate system as depicted in FIG. 4, a vehicle heading angle $\theta$ may be calculated from the FOG 222 output ($\theta$FOG) as follows $$\theta(k)=\theta_{FOG}(k)+\delta(k), \tag{3}$$

where $\delta$ (k) is a drift error of the FOG. Utilizing equation (3), vehicle position (x, y) may be described as $$x(k+1)=x(k)+(v(k)+\delta_v(k))\Delta t \sin(\phi_{FOG}(k)+\delta(k)) \tag{4}$$

$$y(k+1)=y(k)+(v(k)+\delta_v(k))\Delta t \cos(\phi_{FOG}(k)+\delta(k)) \tag{5}$$

where v(k) is a velocity and $\delta_v$ (k) is a speed sensor drift in the k-th step. Using equations (3) to (5), state equations of the vehicle movement may be derived as:

$$\begin{bmatrix} x(k+1) \\ y(k+1) \\ \delta_v(k+1) \\ \delta(k+1) \end{bmatrix} = \begin{bmatrix} 1 & 0 & \Delta t\sin\phi_{FOG}(k) & v(k)\Delta t\cos\phi_{FOG}(k) \\ 0 & 1 & \Delta t\cos\phi_{FOG}(k) & -v(k)\Delta t\sin\phi_{FOG}(k) \\ 0 & 0 & 1 & 0 \\ 0 & 0 & 0 & 1 \end{bmatrix} \begin{bmatrix} x(k) \\ y(k) \\ \delta_v(k) \\ \delta(k) \end{bmatrix} + \begin{bmatrix} v(k)\Delta t\sin\phi_{FOG}(k) \\ v(k)\Delta t\cos\phi_{FOG}(k) \\ 0 \\ 0 \end{bmatrix} + \omega \tag{6}$$

where the $\omega$ is plant noise that can be described as follows:

$$\omega = \begin{bmatrix} \omega_1(k) \\ \omega_2(k) \\ \omega_3(k) \\ \omega_4(k) \end{bmatrix} = \begin{bmatrix} 0 \\ 0 \\ \xi_v(k) \\ \xi_\theta(k) \end{bmatrix}, \tag{7}$$

where $\xi_v$(k) and $\xi_\theta$(k) are noise associated with RTK-GPS 212 and FOG 222, which are assumed to be zero-mean Gaussian sequences.

Considering tractor 10 dimensions, an observation model augmented by RTK-GPS 212 measurements may be expressed as $$\begin{bmatrix} x_{gps}(k) \\ y_{gps}(k) \end{bmatrix} = \begin{bmatrix} 1 & 0 & 0 & L\cos\theta_{FOG}(k) \\ 0 & 1 & 0 & -L\cos\theta_{FOG}(k) \end{bmatrix} \begin{bmatrix} x(k) \\ y(k) \\ \delta_v(k) \\ \delta(k) \end{bmatrix} + \begin{bmatrix} L\sin\theta_{FOG}(k) \\ L\cos\theta_{FOG}(k) \end{bmatrix} + \begin{bmatrix} \xi_x(k) \\ \xi_y(k) \end{bmatrix} \quad (8)$$

where $x_{gps}$ and $y_{gps}$ are observed values by RTK-GPS 212 and L is the distance from the center of gravity (COG) to the GPS antenna, $\xi_x$ is the measurement noise of the GPS (x position), and $\xi_y$ is the measurement noise of the GPS (y position). A system of matrix equations may be generated from equations (1) to (5) such that $$x(k+1)=A(k)x(k)+b(k)+u(k) \quad (9)$$

$$y(k+1)=H(k)x(k)+d(k)+v(k) \quad (10)$$

and using equations 9 and 10, Kalman filter 235 may be derived as $$x(k+1)=A(k)x(k)+b(k)+K(k)(y(k)-H(k)x(k)-d(k)) \quad (11)$$

$$K(k)=A(k)P(k)H(k)^T[H(k)P(k)H(k)^T+R(k)]^{-1} \quad (12)$$

$$P(k+1)=A(k)[P(k)-P(k)H(k)^T(H(k)P(k)H(k)^T+R(k))^{-1}+H(k)P(k)] A(k)^T+G(k)Q(k)G(k)^T \quad (13)$$

where, matrices Q and R are covariance matrices of a plant model and an observation model, respectively, and $\delta$ (t-s) is the Kronecker delta function. Therefore, matrixes Q and R may be defined as $$E(u(t)u^T(s))=\delta(t-s)Q(t) \quad (14)$$

$$E(v(t)v^T(s))=\delta(t-s)R(t). \quad (15)$$

Figure 5:
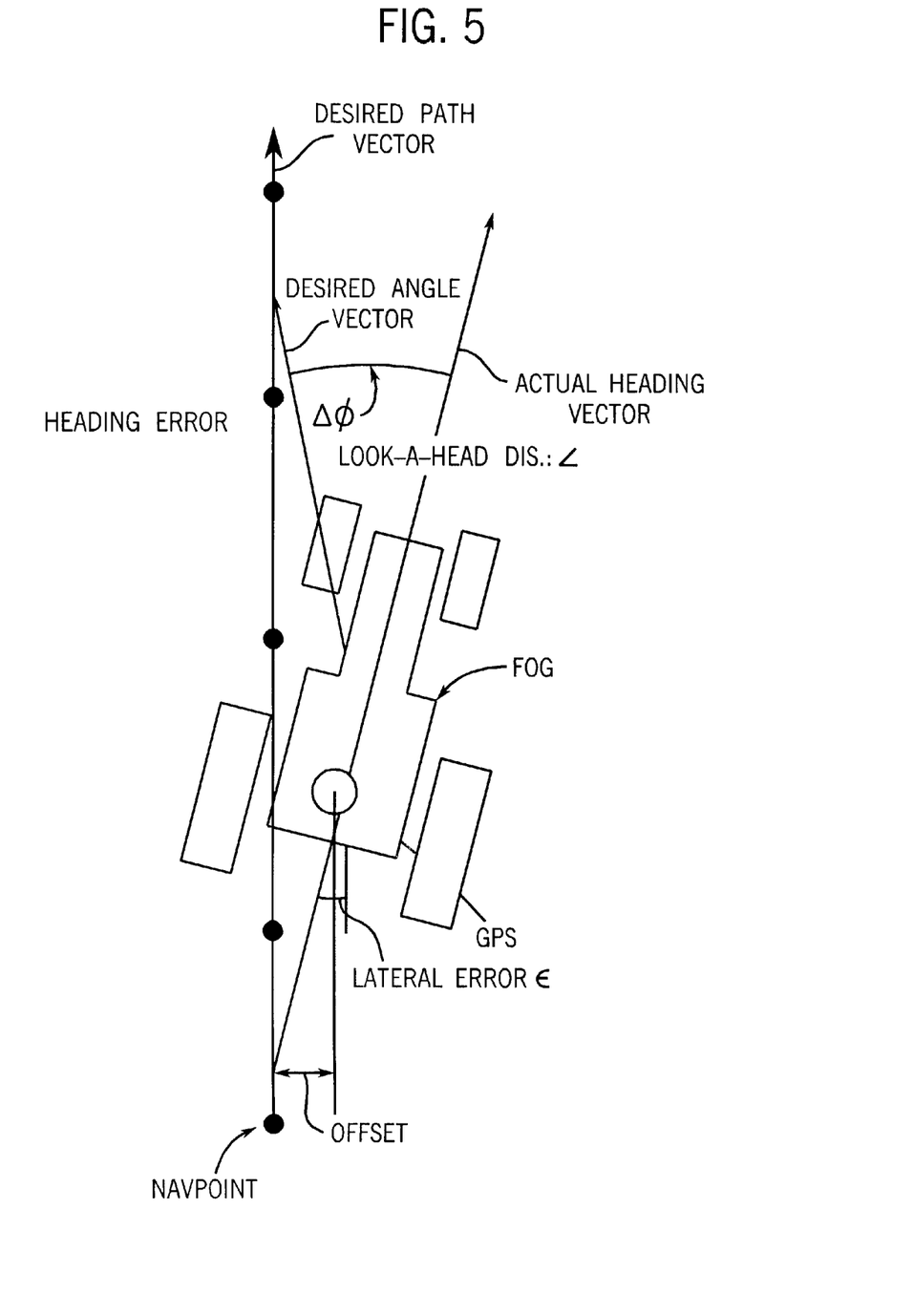
FIG. 5 is a diagram depicting the heading error and offset.

A navigation map may be used for calculating navigation signals from RTK-GPS 212 and FOG 222 (offset and heading error). The navigational map is a set of the NavPoints, and a time series of position data. As depicted in FIG. 5, to calculate the offset $\epsilon$ from the desired path, the two closest points from the current vehicle position are retrieved in the map. The offset may then be calculated by using the two closest NavPoints and the current vehicle position. Additionally, heading error $\Delta\phi$ may be defined as depicted in FIG. 5. The heading error $\Delta\phi$ is a relative angle between the desired angle vector and actual heading vector. The desired angle vector is defined as a vector having a tail that is the point of orthogonal projection onto the map trail and whose head is the point which is look ahead distance L forward in the trail. To calculate a desired steering angle, $\Delta\psi$, a proportional controller for both a heading error and an offset may be generated as follows $$\Delta\psi(k)=k_\phi\Delta\phi(k)+k_p\epsilon(k) \quad (16)$$

A machine vision function also provides a heading and an offset which are the critical parameters for vehicle guidance. A machine vision system may include a CCD camera, a frame grabber, and a computer. The camera may include a near infrared filter (800 nm) to improve discrimination between plant material and soil, however, other camera setups may be similarly applied. Heuristic methods may be used to detect the guidance directrix. The directrix position may be enhanced in an image by highlighting the center position of run-length encoded segments. Points in various directrix classes may be determined by unsupervised classification. Each directrix class may be used to determine a trajectory of the directrix in each image, then may be used to determine the vanishing point of the trajectories. The vanishing point may be related to the heading of the vehicle and the offset of the vehicle relative to the directrix. In an alternative embodiment, a Hough transform is used to detect line features representing crop rows. Images from the camera provide a field of view ahead of the vehicle. Further, in alternative embodiments a variety of classification methodologies may be used to distinguish crop from soil, including, but not limited to, k-means clustering, Kohonen learning, and the like.

Image coordinates ($X_i$, $X_i$) represent a 2-D projection of a 3-D field pathway. The image coordinates in such a situation may be represented by the homogeneous actual pathway coordinates ($x_p$, $y_p$, $z_p$), where $$\begin{bmatrix} x_i \\ y_i \\ t_i \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} x_p \\ y_p \\ 1 \end{bmatrix}, \text{ where} \quad (17)$$

$$X_i = \frac{x_i}{t_i} \quad (18)$$

$$Y_i = \frac{y_i}{t_i}$$

In the process of vehicle guidance planning, it is preferable to provide a two dimensional directrix related to the vehicle. A static calibration may be used to map the image coordinates ($X_i$, $Y_i$) into the vehicle coordinates ($x_v$, $y_v$) for converting the directrix referred to the camera, to the directrix referred to the camera vehicle, to support automated guidance. After calculating a field pathway under the vehicle coordinate system, the offset ($\epsilon$) and the heading error ($\Delta\phi$) based on the same definition with a map-based guidance, may be easily calculated. Using these navigation signals from machine vision 30 (namely, $\epsilon$ and $\Delta\phi$), the desired steering angle $\Delta\psi$ is also determined by equation (14).

Figure 6:
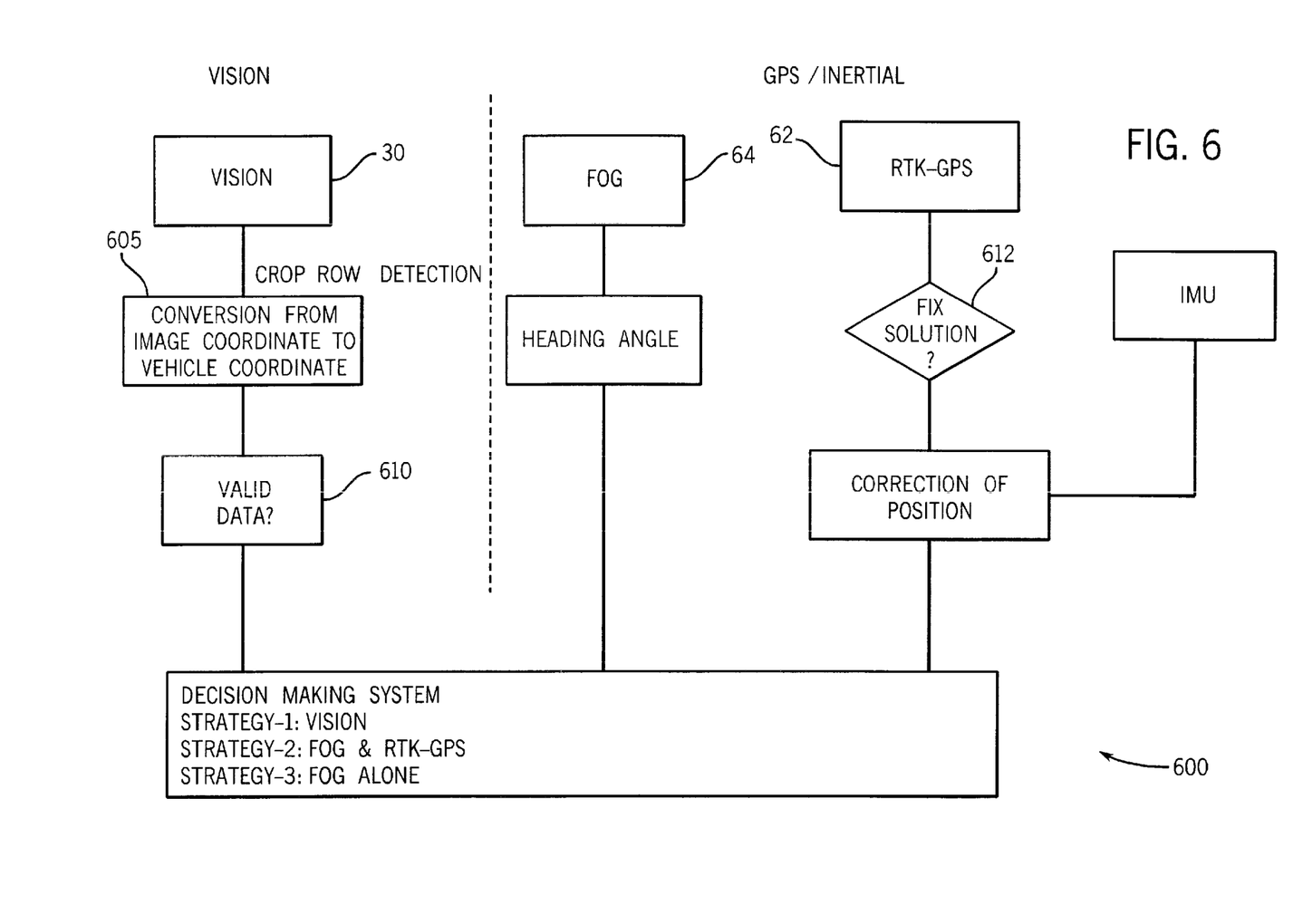
FIG. 6 is a flowchart of the integrated guidance system.

In one embodiment, there are three types of navigation strategies, modes of operation, or control modes; GPS/FOG mode, FOG alone mode, and machine vision mode. The mode of operation is decided in step 240 (FIG. 3). As previously stated, the outdoor environment where an off-road vehicle, such as a tractor, is utilized, includes many disturbances to the sensors. To insure the reliability and stability of navigation system 21 multiple control strategies are used, and real-time switching between the three modes of operation is required during actual use, as depicted in flowchart 600. Further, the three operational modes are required for having a crop management navigation system that may be used from tillage to harvesting.

Figure 7:
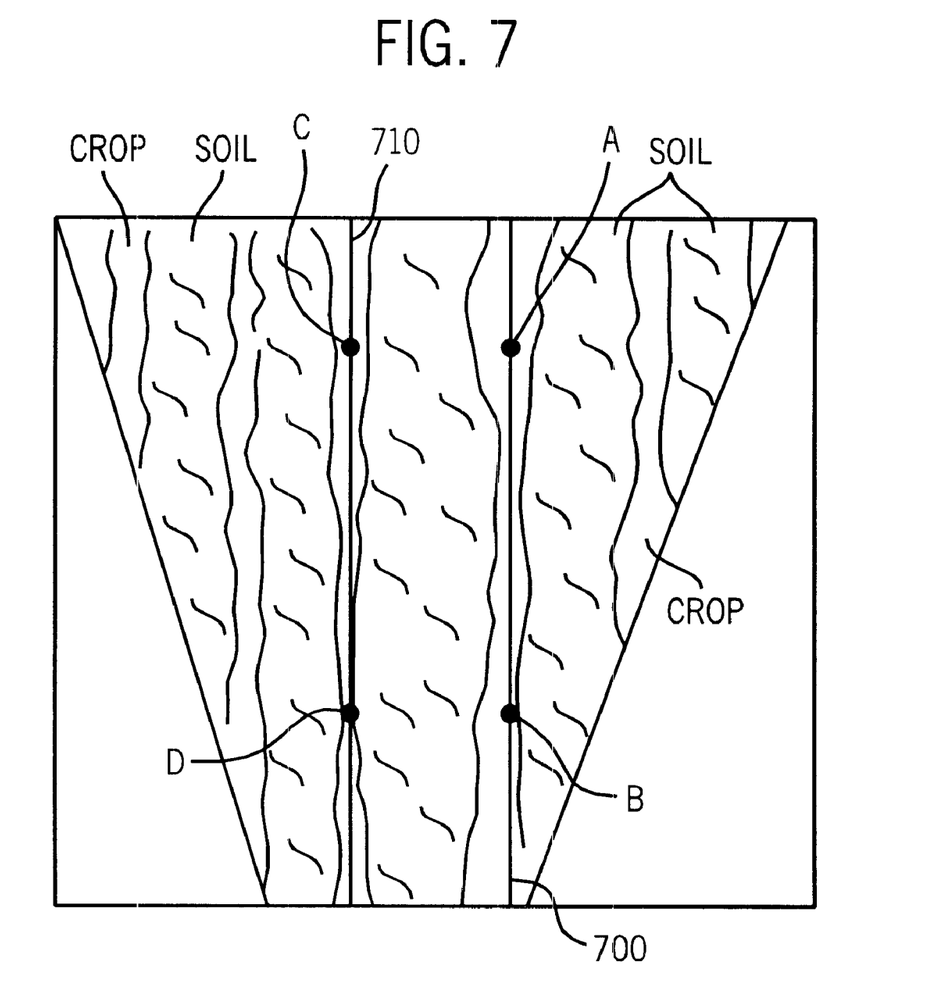
FIG. 7 is a diagram depicting crop and soil as distinguished using a vision system.

In an exemplary embodiment, the operational or sensing mode may be determined by a rule-based methodology. Machine vision data is given foremost priority for the system because of the potential for high accuracy. If navigation signals from machine vision system 30 are not valid, the GPS/FOG mode may be chosen as the operational or sensing mode. If both the machine vision mode and the RTK-GPS are not valid in step 610 after crop row detection step 605, a dead reckoning method, based on FOG 64 is used to control steering angle, determined in decision making system 620. The situation in which a dead reckoning mode is used has a low probability during actual use. Determination of the validity of RTK-GPS 62 (FIG. 1) signals is conducted by continuously checking the health of GPS data being received. The RTK-GPS 62 may provide the solution type of positioning during each step, a fixed solution (step 612, FIG. 6), a float solution, etc. Since only the fixed solution 612 certifies the positioning error within two centimeters, the detection of GPS data validity is determined by detecting the health of this signal. On the other hand, detection of data validity for machine vision may be experimentally determined. Rules may be developed to determine the validity of machine vision data. For instance, the three rules provided below may be used to determine vision data validity in step 610:

$$\text{row width} - w_a < \text{Distance}(\overline{AB}, C) < \text{row width} + w_a \quad (a)$$

$$\text{row width} - w_a < \text{Distance}(\overline{AB}, D) < \text{row width} + w_a \quad (b)$$

Heading error in k-step $$\text{fabs}(\Delta\phi(k) - \Delta\phi(k-1)) < \Delta\phi_a, \quad (c)$$

where $w_a$ and $\Delta\phi_a$ are experimentally determined, and A, B, C, D are depicted in FIG. 7 as points on the approximated crop row lines 700 and 710. In the rules above, the width of crop rows is a priori information because the width has already been determined by the specifications of a planter. In rule (c), the heading angle changed during a processing step is investigated by comparing it to a threshold allowable heading angle change ($\Delta\phi_a$). Finally, if the row width and a heading angle detected by the machine vision meet these three criteria, the machine vision mode may be adopted as the control strategy among the three control modes. Because selecting a sensing or mode of operation is conducted in each control step, the most appropriate operational or sensing mode may be chosen among the three sensing modes during automatic guidance.

In an exemplary embodiment, navigation system 21 may be installed on a CaselH MX240 four-wheel drive agricultural tractor with multiple sensors, available from Case Corporation of Racine, Wis. However, navigation system 21 may be installed in any off-road or agricultural vehicles, not limited to the vehicles disclosed above. The tractor 10 may be equipped with any of a variety of computing devices including a desktop computer as the sensor fusion unit, such as, but not limited to a Solo 2500 300 MHz Laptop computer available from Gateway of Sioux City, S. Dak.

While the preferred embodiment refers to a guidance and navigation system for a tractor, the invention may also be applied to a variety of off-road vehicles and other vehicles requiring automated guidance.

Further, while the exemplary embodiments refer to specific estimation and sensing methodologies, the discussion of specific methodologies are to be interpreted broadly. The embodiment may encompass those various sensing and control methodologies which are applicable to the disclosed guidance system.

Further still, those who have skill in the art will recognize that the present invention is applicable with many different hardware configurations, software architectures, communications protocols, and organizations or processes.

While the detailed drawings, specific examples, and particular formulations given describe exemplary embodiments, they serve the purpose of illustration only. The materials and configurations shown and described may differ depending on the chosen performance characteristics and physical characteristics of the vehicle and sensing equipment. For example, the type of sensing equipment may differ. The systems shown and described are not limited to the precise details and conditions disclosed. Furthermore, other substitutions, modifications, changes, and omissions may be made in the design, operating conditions, and arrangement of the exemplary embodiments without departing from the spirit of the invention as expressed in the appended claims.

What is claimed is:

1. An automatic guidance system for an agricultural vehicle, the guidance system comprising:

at least two sensors configured to gather information representative of at least one of vehicle relative position and attitude wherein at least one of the sensors is a vision sensor;

an information processor having a memory and a central processing unit, and the information processor coupled to the at least two sensors; and a program in the memory of the information processor configured to be executed by the central processing unit, the program configured to select a mode of operation, from at least two modes of operation, based on the information from the at least one sensor, each mode of operation running a different control program, wherein the at least two modes of operation includes a vision mode.

2. The guidance system of claim 1, wherein the at least two sensors includes a global positioning system receiver.

3. An automatic guidance system for an agricultural vehicle, the guidance system comprising:

at least two sensors configured to gather information representative of at least one of vehicle relative position and attitude wherein at least one of the sensors is a gyroscope;

an information processor having a memory and a central processing unit, and the information processor coupled to the at least two sensors; and a program in the memory of the information processor configured to be executed by the central processing unit, the program configured to select a mode of operation, from at least two modes of operation, based on the information from the at least one sensor, each mode of operation running a different control program, wherein the gyroscope is a fiber optic gyroscope.

4. The guidance system of claim 3, wherein the at least two modes of operation includes a gyroscope mode.

5. The guidance system of claim 3, wherein the at least two sensors includes a global positioning system receiver.

6. The guidance system of claim 5, wherein the at least two modes of operation includes a combined global positioning system receiver and gyroscope mode.

7. The guidance system of claim 6, wherein the combined global positioning system receiver and gyroscope mode uses a Kalman filter.

8. The guidance system of claim 3, wherein the program is configured to select a mode of operation by using a rule-based methodology.

9. The guidance system of claim 1, wherein the vision mode of operation is given greatest priority.

* * * * *